(12) United States Patent
Satoh

(10) Patent No.: US 6,700,615 B1
(45) Date of Patent: Mar. 2, 2004

(54) AUTOFOCUS APPARATUS

(75) Inventor: Masaki Satoh, Miyagi (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/412,756

(22) Filed: Oct. 5, 1999

(30) Foreign Application Priority Data

Oct. 12, 1998 (JP) .......................................... 10-289732

(51) Int. Cl.[7] .......................... H04N 5/232; G03B 3/10; G03B 13/00
(52) U.S. Cl. ........................ 348/345; 348/347; 348/349; 396/121; 396/128
(58) Field of Search ................................ 348/345, 349, 348/350, 353, 347, 357, 354; 396/80, 121–128

(56) References Cited

U.S. PATENT DOCUMENTS

| | | | | |
|---|---|---|---|---|
| 4,600,830 A | * | 7/1986 | Tokutomi et al. ........... | 396/119 |
| 5,115,319 A | * | 5/1992 | Arai et al. .................. | 348/363 |
| 5,485,209 A | * | 1/1996 | Muramoto et al. .......... | 348/349 |
| 6,473,126 B1 | * | 10/2002 | Higashihara et al. ....... | 348/345 |
| 6,496,225 B1 | * | 12/2002 | Higashihara et al. ....... | 348/345 |

* cited by examiner

*Primary Examiner*—Andrew Christensen
*Assistant Examiner*—Nhan Tran
(74) *Attorney, Agent, or Firm*—Oblon, Spivak, McClelland, Maier & Neustadt, P.C.

(57) ABSTRACT

An autofocus apparatus sets a portion of an image frame as an AF area. Then, in first image-pickup, acquires first image data for the AF area within the image frame according to a first light flux from an object passing through an aperture of the diaphragm when the diaphragm is not shifted. Further, in second image-pickup, acquires second image data for the AF area within the image frame according to a second light flux from the object passing through the aperture of the diaphragm when the diaphragm is shifted in one vertical direction with respect to the optical axis. A cross correlation between the first image data and the second image data is computed, and a distance up to a focus position of the focal lens as well as a direction thereof is computed according to the cross correlation. Then, the focal lens is driven to the focus position.

16 Claims, 8 Drawing Sheets

OBJECT BRIGHT

FOCAL POINT IS CONTROLLED IN PHOTOGRAPHING (NOT SHIFTED)

POSITION OF THE FOCAL LENS 101

FOCAL POINT IS CONTROLLED (SHIFTED)

POSITION OF THE FOCAL LENS 101

OBJECT DARK

FOCAL POINT IS CONTROLLED IN PHOTOGRAPHING (NOT SHIFTED)

POSITION OF THE FOCAL LENS 101

FOCAL POINT IS CONTROLLED (SHIFTED)

POSITION OF THE FOCAL LENS 101

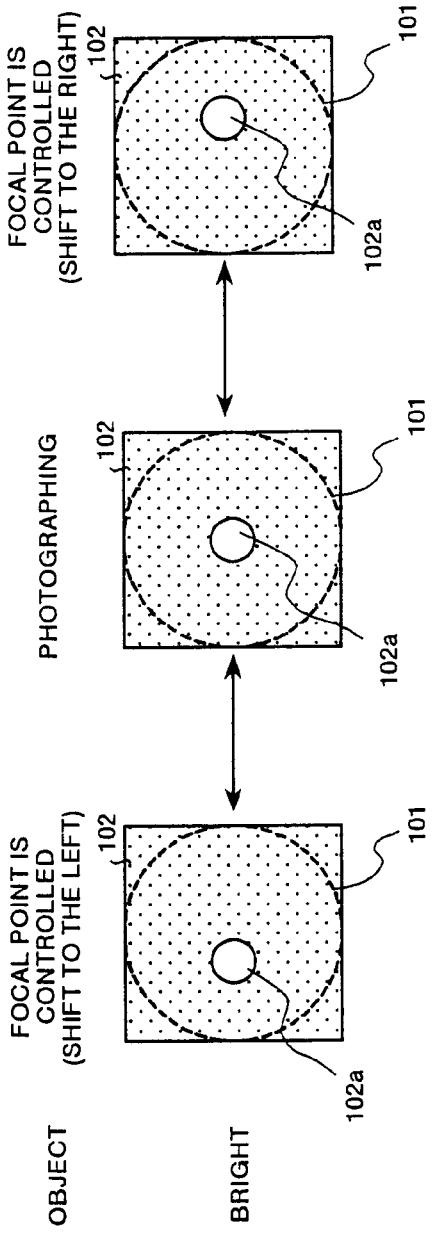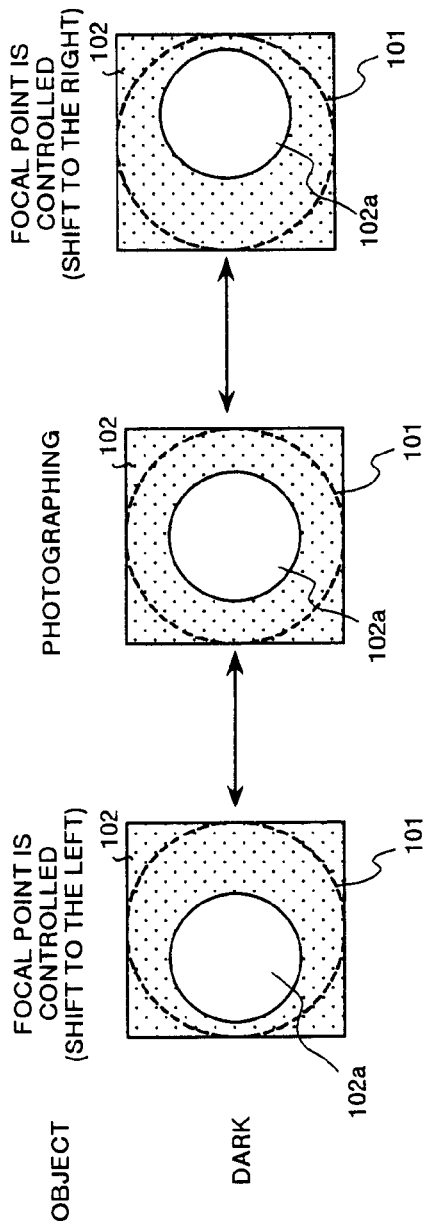

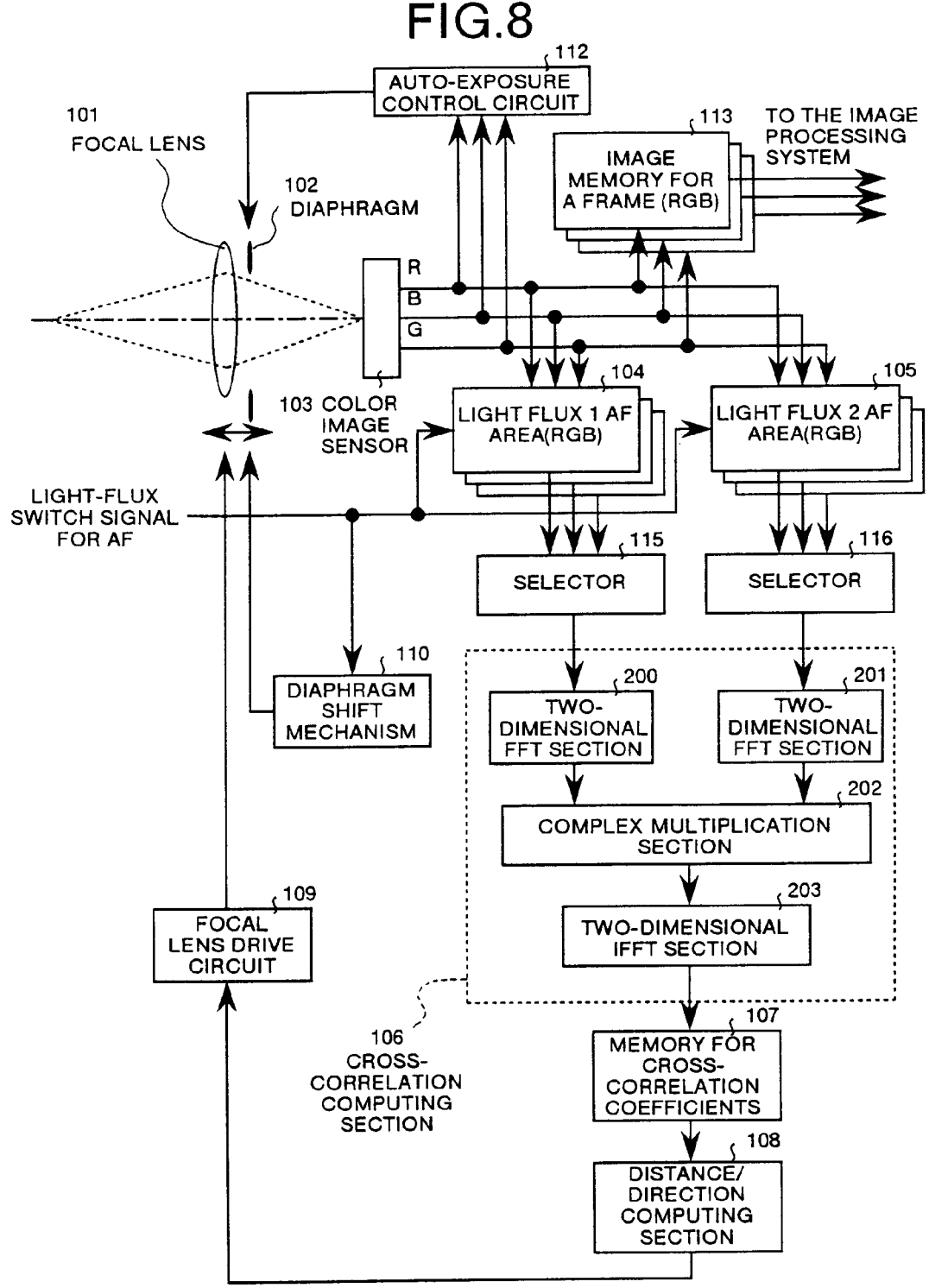

AUTOFOCUS APPARATUS

FIELD OF THE INVENTION

The present invention relates to an autofocus apparatus. More particularly this invention relates to an autofocus apparatus applied in image input equipment such as a digital still camera, a digital video camera or the like that use an image pickup element.

BACKGROUND OF THE INVENTION

In association with heat-up of competition in the recent digital camera market, cost reduction will become inevitable, thus reduction of a number of components becomes an important issue. Considering the circumstances as described above, there is a microprocessor (including a DSP) as one of main components of a digital camera and a recent processor has reached a capability of a sufficient throughput as a controller for a camera despite of its low cost. Therefore, a digital camera tends to substitute an image pickup system with digital signal processing for a function of a distance measurement module (AF sensor) component of a silver-salt camera. The technology described above includes mainly "Exploratory method", "Auto-correlation method", and "Cross-correlation method".

In a focusing system based on the generally known exploratory method, although an AF evaluated value (which is computed from a high-frequency component of the image) at a position where an image is fetched is obtained, it is difficult to detect whether a focal point exists in front of or in back of a position of the focal lens. Thus, AF evaluated values of all over a range where a lens moves are required in order to detect a focus position with a maximum point evaded. Therefore, the whole range is required to be photographed a number of times, and an operation of moving the lens back to the position of a focal point is added, so that it takes a longer time to obtain a correct focal position. In addition, there is another problem such as malfunction when the surrounding is too bright.

In a focusing system based on the auto-correlation method, two or more of different light fluxes are picked up in one frame. In this case, there is a merit that, focus information can be obtained from the fetched image by one frame. On the other hand, there is a drawback that an extremely high peak value is shown at an original position (focal point) of an auto-correlation coefficient because a correlation is obtained based on the identical data. Hence, there is a problem here that it is necessary to depend upon some other system when the position is adjacent to the focal point.

In a focusing system based on the cross-correlation method, two or more of different light fluxes are picked up in different frames respectively, which requires two or more of frames to be prepared. However, there is an advantage that the possibility of occurrence of an extremely high peak value at the original position like in the auto-correlation method is eliminated. Thus, AF information for a range from a position adjacent to the focal point to a distant location can be obtained without being buried in the peak value.

In the above-mentioned cross-correlation method, however, an amount of cross-correlation computations with respect to the whole frames exceeds a practical range so that a long time is required. In addition, it is required to prepare two different light fluxes with a diaphragm plate for AF for obtaining focus information, although such a diaphragm plate for AF is not needed at the time of photography. Furthermore, the aperture of the diaphragm plate for AF is fixed, so that it is disadvantageously difficult to optimize an amount of light received by the image sensor.

SUMMARY OF THE INVENTION

In light of the problems described above, it is an object of the present invention to provide an autofocus apparatus enabling a high-speed focusing operation with low cost configuration.

In one aspect of the present invention, there are provided a diaphragm for restricting a light flux from an object as a target for focusing and a diaphragm shift mechanism for shifting the diaphragm in one vertical direction with respect to an optical axis of a focal lens. A portion of an image frame is set as an AF area. In first image-pickup, first image data is acquired for the AF area within the image frame according to a first light flux from the object passing through an aperture section of the diaphragm when the diaphragm is not shifted by the diaphragm shift mechanism. In second image-pickup, second image data is acquired for the AF area within an image frame according to a second light flux from the object passing through the aperture section of the AF when the diaphragm is shifted in one vertical direction with respect to the optical axis by the diaphragm shift mechanism. A cross correlation between the first image data and the second image data is calculated. Then, a distance up to a focus position of the focal lens as well as a direction thereof is computed according to the cross correlation to drive the focal lens to the focus position.

In an another aspect of the present invention, there are provided a diaphragm for restricting a light flux from an object as a target for focusing and a diaphragm shift mechanism for shifting the diaphragm in two vertical directions with respect to an optical axis of a focal lens. A portion of an image frame is set as an AF area. In first image-pickup, first image data is acquired for the AF area within the image frame according to a first light flux from the object passing through an aperture section of the diaphragm when the diaphragm is shifted in one of the vertical directions by the diaphragm shift mechanisms. In second image-pickup, second image data is acquired for the AF area within the image frame according to a second light flux from the object passing through the aperture section of the diaphragm when the diaphragm is shifted in the other one of the vertical directions by the diaphragm shift mechanism. A cross correlation between the first image data and the second image data is computed. Then, a distance up to a focus position of the focal lens as well as a direction thereof is computed according to the cross correlation to drive the focal lens to the focus position.

Other objects and features of this invention will become apparent from the following description with reference to the accompanying drawings.

BRIEF DESCRIPTION OF THE DRAWINGS

FIGS. 7A to 7F are views for explaining a case where the aperture of the diaphragm is shifted in two vertical directions (left vertical direction and right vertical direction) symmetric with respect to the optical axis of the lens; and FIG. 8 is a block diagram showing configuration of a digital camera with an autofocus apparatus according to Embodiment 2 applied therein.

DESCRIPTION OF THE PREFERRED EMBODIMENTS

Detailed description is made hereinafter for the preferred embodiments where the autofocus apparatus according to the present invention is applied in a digital camera with reference to the attached drawings.

Figure 1:
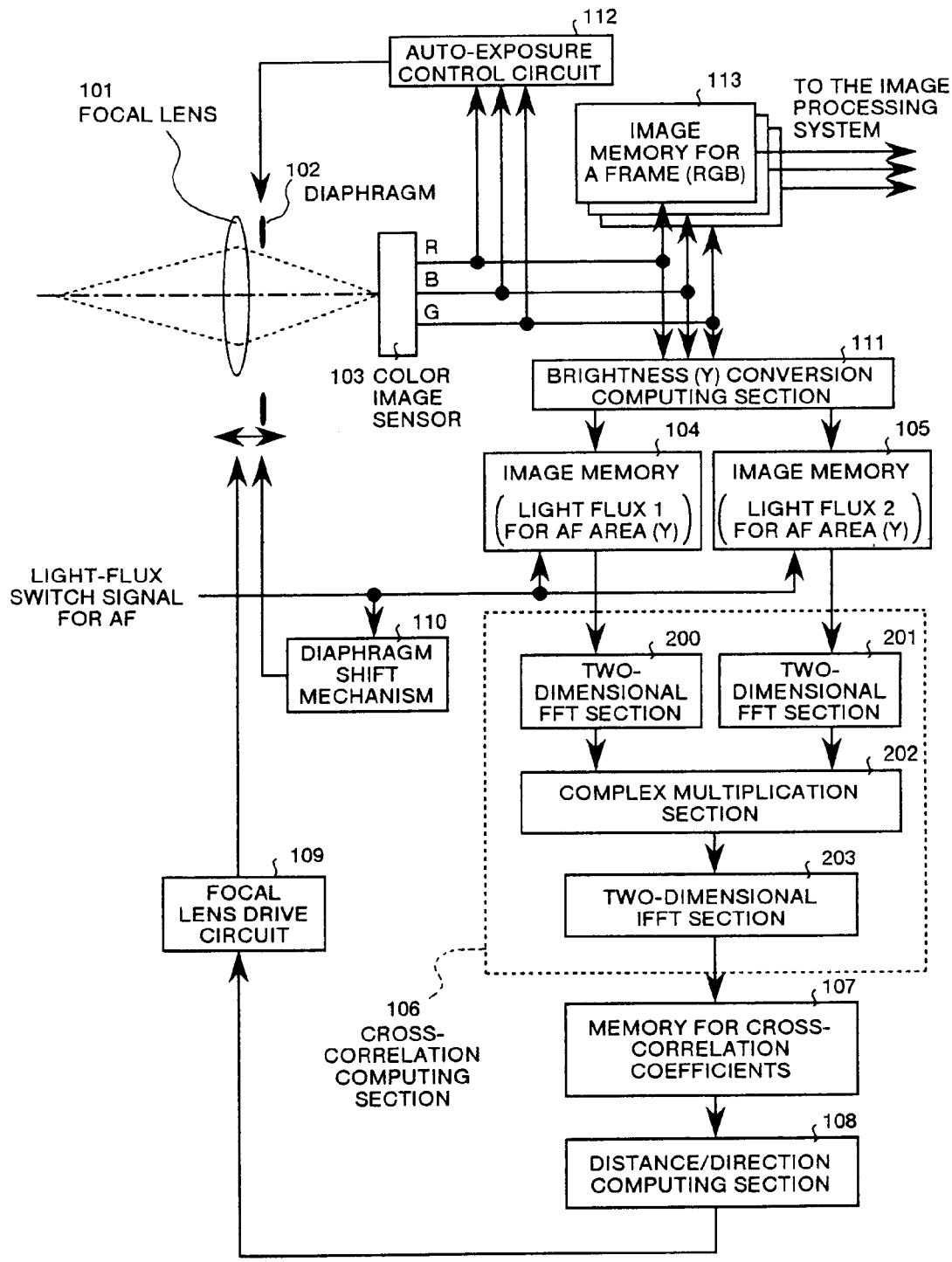
FIG. 1 is a block diagram showing configuration of a digital camera with an autofocus apparatus according to Embodiment 1 applied therein.

FIG. 1 is a block diagram of an AF processing system in a digital camera according to Embodiment 1. In this figure, the reference numeral 101 indicates a focal lens located on the optical axis thereof, which is provided for the purpose of forming an image of an object on a color image sensor 103 as a target for focusing. The reference numeral 102 indicates a diaphragm, which is located in the rear side of the focal lens 101 and provided for the purpose of restricting a light flux (light quantity) passing through the focal lens 101.

The reference numeral 103 indicates a color image sensor (primary colors' type) comprising a color CCD or the like for converting a formed image of an object to electric signals to output the signals as image data (RGB data). A sensor for complementary colors YMC may be used as the color image sensor 103. This color image sensor 103 can make random access to pixels, so that image data for an arbitrary area within an image frame can be transmitted. The focal lens 101, diaphragm 102, and color image sensor 103 form an image-pickup optical system.

The reference numeral 111 indicates a brightness conversion computing section for converting input image data (RGB data) to a brightness signal. The reference numerals 104 and 105 indicate image memories for storing therein a first brightness signal according to first image data (light flux 1) and a second brightness signal according to second image data (light flux 2) for each AF area within image frames obtained by picking up images by means of first and second image-pickup for AF respectively.

The reference numeral 106 indicates a cross-correlation computing section for computing a cross-correlation coefficient between the first brightness signal and second brightness signal stored in the image memories 104 and 105. The cross-correlation computing section 106 comprises a two-dimensional FFT section 200 for computing two-dimensional FFT from the first brightness signal stored in the image memory 104, a two-dimensional FFT section 201 for computing two-dimensional FFT computation from the second brightness signal stored in the image memory 105, a complex multiplication section 202 for executing complex multiplication of the first brightness signal and second brightness signal subjected to two-dimensional FFT in the two-dimensional FFT section 200 and the two-dimensional FFT section 201 respectively, and a two-dimensional IFFT section 203 for executing two-dimensional IFFT to a result of complex multiplication in the complex multiplying section 202.

The reference numeral 107 indicates a memory for cross-correlation coefficients for storing therein cross-correlation coefficients computed in the cross-correlation computing section 106. The reference numeral 108 indicates a distance/direction computing section for computing a distance up to a focus position of a focal lens 101 as well as a direction thereof according to a cross-correlation coefficient computed in the cross-correlation computing section 106.

The reference numeral 109 indicates a focal lens drive circuit for driving the focal lens 101 along the optical axis thereof in order to adjust the focus according to a result of computation in the cross-correlation computing section 106. The reference numeral 110 indicates a diaphragm shift mechanism for shifting the diaphragm 102 to one vertical direction with respect to the optical axis (a direction of focus adjustment) according to a light-flux switch signal for AF from a not illustrated control section. The reference numeral 112 indicates an auto-exposure control section for automatically controlling a numerical aperture of the diaphragm 102 according to the brightness of the object. The reference numeral 113 indicates an image memory for a frame with image data by one frame of a picked-up image stored therein for each color (RGB) when a photograph is taken under normal conditions.

Figure 2A:
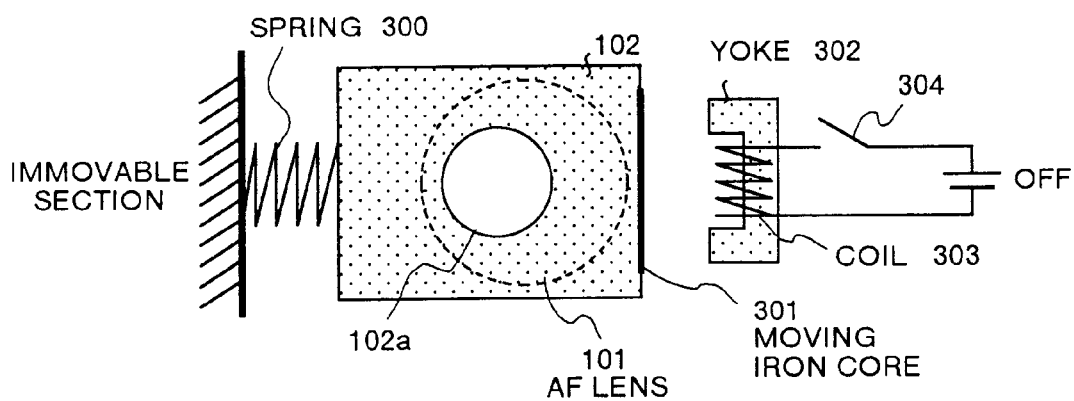
FIGS. 2A and 2B are views each showing an example of general configuration of a diaphragm shift mechanism in FIG. 1.
Figure 2B:
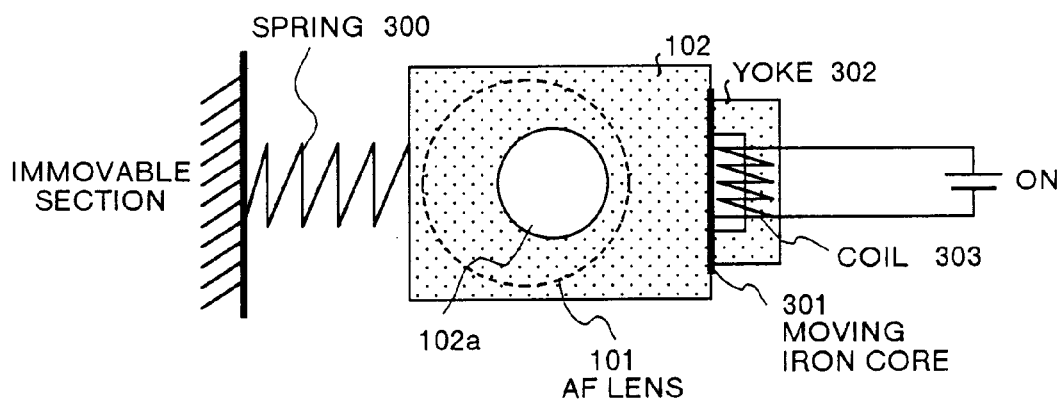

FIG. 2A and 2B show an example of general configuration of the above mentioned diaphragm shift mechanism 110. The diaphragm shift mechanism 110 shown in these figures uses a mechanism based on driving with a spring-solenoid. More specifically, FIG. 2A shows a case where the diaphragm shift mechanism 110 is OFF, while FIG. 2B shows a case where the diaphragm shift mechanism 110 is ON.

As shown in these figures, one end of a spring 300 is fixed to one edge of the diaphragm 102, and the other end of the spring 300 is fixed to an immovable section of a main body of the digital camera. Thus the diaphragm 102 is energized in a direction of the immovable section. A moving iron core 301 is fixed to the other edge of the diaphragm 102. A yoke 302 is provided at a specified distance from the moving iron core 301, and a coil 303 is wound around this yoke 302. A power unit 304 is connected to both ends of the coil 303 via a switch 304. The diaphragm shift mechanism 110 operates based on the closing (ON) of this switch 304.

When the diaphragm shift mechanism 110 is ON (switch 304 is ON), as shown in FIG. 2B, the yoke 302 acts as an electromagnet, the moving iron core 301 is pulled toward the yoke 302, and the diaphragm 102 shifts in the vertical direction with respect to the optical axis (direction of focus adjustment). When photographing for AF, in first image-pickup, the diaphragm shift mechanism 110 passes a light flux 1 through the aperture section 102a located at the position shown in FIG. 2A, while passes, in second image-pickup, a light flux 2 through the aperture section 102a located at the position shown in FIG. 2B.

Figure 3A:
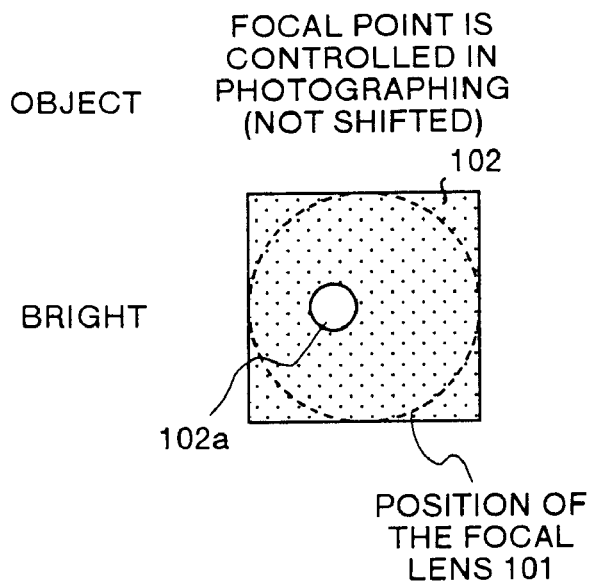
FIGS. 3A to 3D are views for explaining a case where the aperture of the diaphragm is shifted in one vertical direction with respect to the optical axis of the focal lens.
Figure 3B:
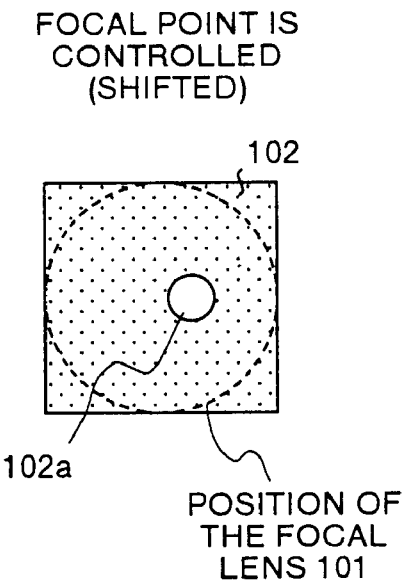
Figure 3C:
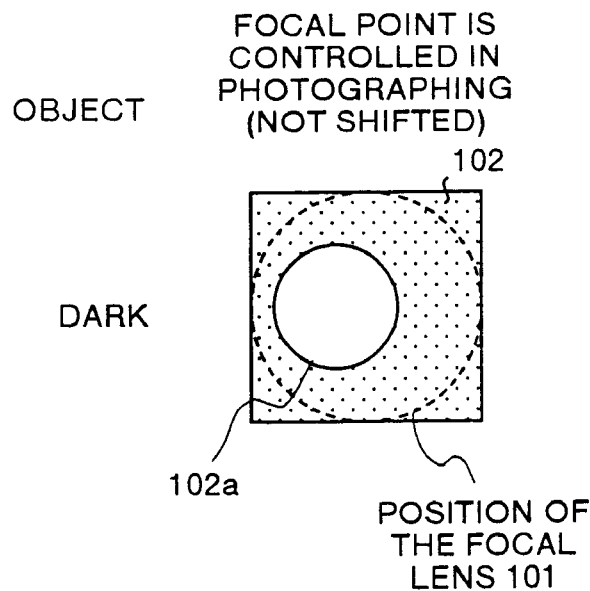
Figure 3D:
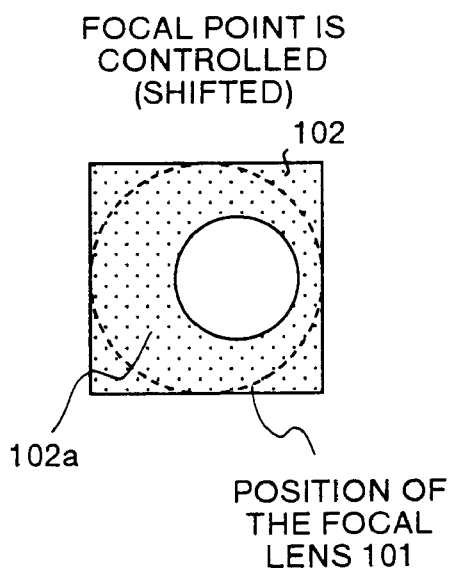

FIG. 3A to 3D explain a case where the aperture section 102a of the diaphragm 102 is shifted in one vertical direction with respect to the optical axis by using the diaphragm shift mechanism 110 having the above mentioned configuration. FIG. 3A shows a case where the diaphragm 102 is not shifted and the object is bright. FIG. 3B shows a case where the diaphragm 102 is shifted and the object is bright. FIG. 3C shows a case where the diaphragm 102 is not shifted and the object is dark. FIG. 3D shows a case where the diaphragm 102 is shifted and the object is dark. A numerical aperture of the aperture section 102a in the diaphragm 102 is determined by the auto-exposure control section 112 as described above. Further, ordinary photographing is carried out under the situation that the diaphragm 102 is not shifted (Refer to FIGS. 3A and 3C).

As described above, the diaphragm shift mechanism 110 sets the aperture section 102a of the diaphragm 102 at a different position to pass a different light flux (light flux 1 and light flux 2) through the aperture section 102a at each of the positions. FIG. 2A and FIG. 2B described above show one of modes of the diaphragm shift mechanism according to the present invention. It is needless to say that the diaphragm shift mechanism according to the present invention is not limited to the configuration shown in FIG. 2A and FIG. 2B described above.

Figure 4A:
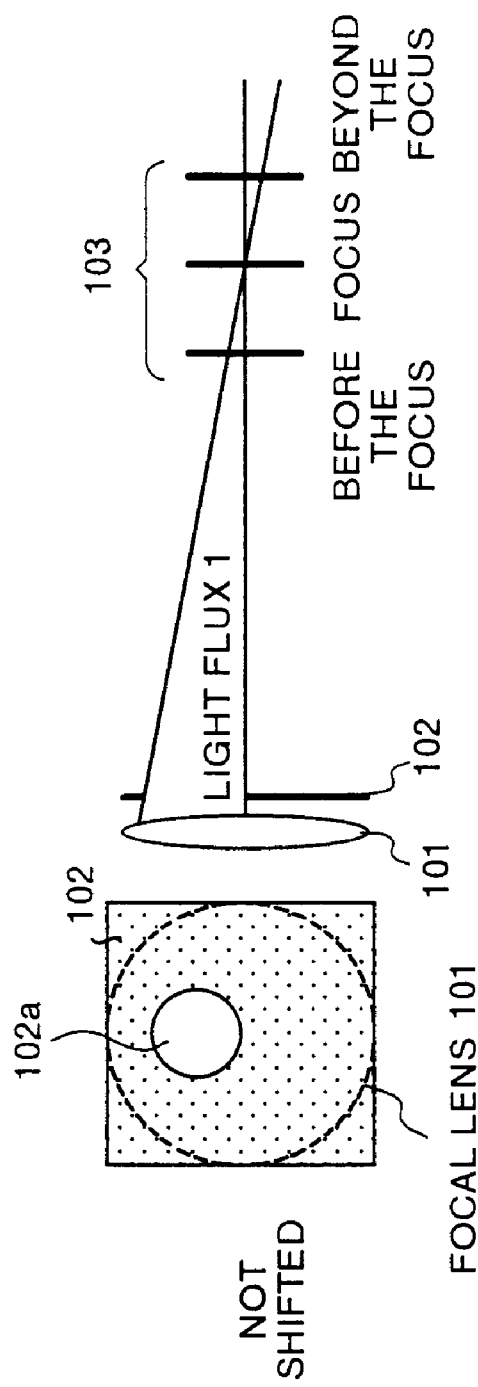
FIGS. 4A and 4B are explanatory views for explaining principle of AF of the digital camera in FIG. 1.

Next description is made for principles of an AF operation of the above mentioned digital camera with reference to FIGS. 4A to FIG. 6C. FIG. 4A and FIG. 4B explain AF principles of the digital camera. In these figures, the focal lens 101, diaphragm 102, and color image sensor 103 are schematically shown. FIG. 4A shows a state of the light flux (light flux 1) passing through the aperture section 102a when the diaphragm 102 is not shifted, while FIG. 4B shows a state of the light flux (light flux 2) passing through the aperture section 102a when the diaphragm 102 is shifted.

Figure 4B:
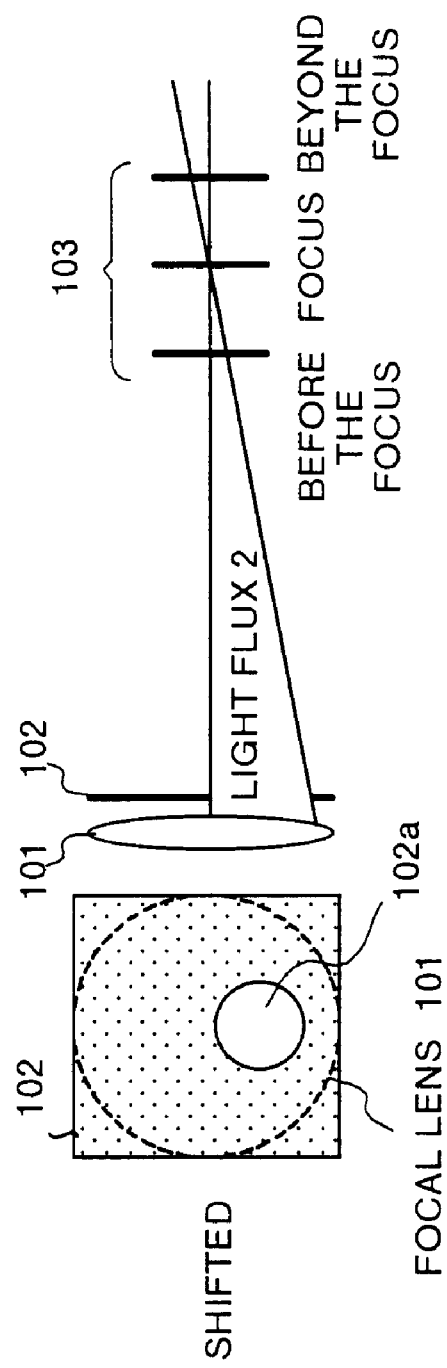

In photographing for AF, at first, in first image-pickup, a light flux 1 having passed through the focal lens 101 and the aperture section 102a of the diaphragm 102 is formed on the color image sensor 103 in a state where the diaphragm 102 is not shifted as shown in FIG. 4A, and the light flux 1 is fetched by the color image sensor 103. Then, in second image-pickup, as shown in FIG. 4B, a light flux 2 having passed through the focal lens 101 and the aperture section 102a of the diaphragm 102 is formed on the color image sensor 103 in a state where the diaphragm 102 is shifted in the vertical direction with respect to the direction of the optical axis, and the light flux 2 is fetched by the color image sensor 103. Namely, the position of the aperture section 102a in the diaphragm 102 is shifted to fetch a different light flux (light flux 1 and light flux 2) based on time-division switching.

Figure 5:
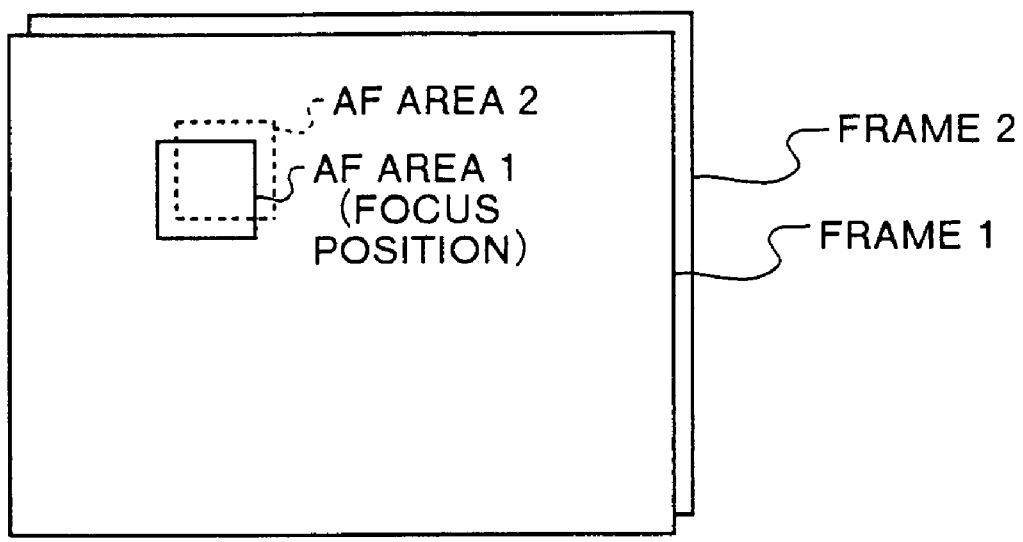
FIG. 5 is a view showing image frames of a color image sensor in FIG. 1 and AF areas of the frames.

FIG. 5 shows image frames of the color image sensor 103 and AF areas of the frames. In this figure, assuming that a frame of image data (light flux 1) obtained by the first image-pickup is frame 1 and a frame of image data (light flux 2) obtained by the second image-pickup is frame 2, AF areas (each position of a focus) are set within the frame 1 and frame 2. Each of the AF areas may arbitrarily be set by the photographer, or may be preset. Image data for the AF areas within the frames 1 and 2 is transmitted to the brightness (Y) conversion computing section 111 as first image data and second image data respectively. Namely, light fluxes are discretely fetched when being photographed twice, and two groups of image data for the AF areas are outputted.

Then, the first image data and the second image data are converted to brightness signals by the brightness (Y) conversion computing section 111, and the signals are stored in the image memories 104 and 105 as the first brightness signal and second brightness signal respectively. After the step, by computing a cross-correlation coefficient from the two image data (brightness signals), it is detected in what degree and in which direction the two image data are displaced based on a direction and a distance from the original position to a peak point (black point) of the correlation value.

Figure 6A:
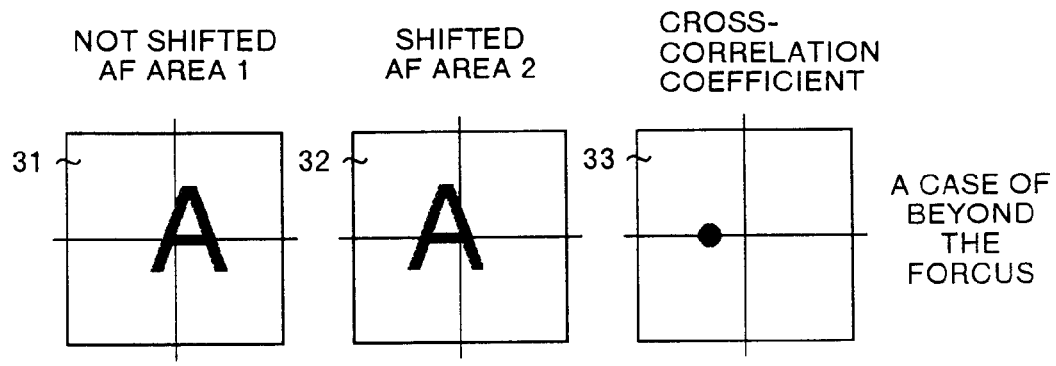
FIGS. 6A to 6C are views each showing an example of relation among first image data (AF area for a light flux 1), second image data (AF area for a light flux 2) on an AF area, and a cross-correlation coefficient therebetween.
Figure 6B:
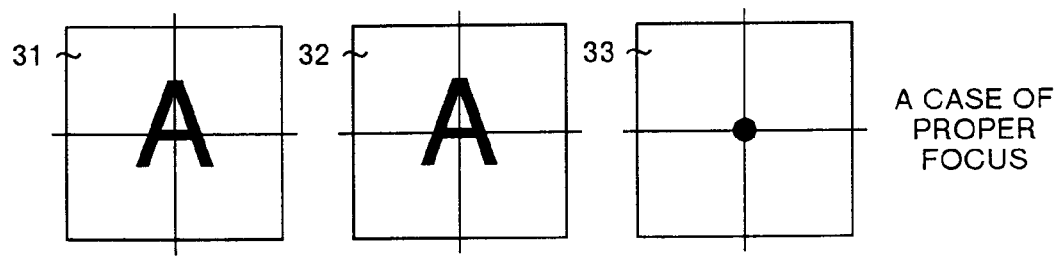
Figure 6C:
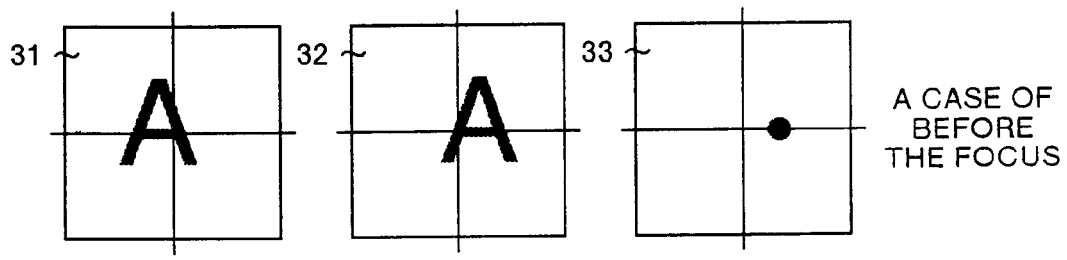

FIGS. 6A to 6C an example of a relation between the cross-correlation coefficient of the first image data (AF area of a light flux 1), and the second image data (AF area of a light flux 2) on the above mentioned AF area. FIG. 6A shows a case where focus is set beyond a desired position, FIG. 6B shows a case of proper focus, and FIG. 6C shows a case where the focus is set before a desired position. A cross-correlation coefficient (33) is computed from the two image data (31, 32), and it is detected in what degree and in which direction the two image data are displaced based on a direction and a distance from the original position to the peak point (black point) of the correlation value. A distance up to the focus position of the focal lens 101 as well as a direction thereof is computed according to the result of detection. A case where displacement is larger means that the image is at a position further from the focus position, and a case where there is no displacement means that the image is on the focus position.

Next brief description is made for an entire operation of the above mentioned digital camera with reference to FIG. 1. When a shutter button not shown herein is half-pressed by the photographer, an image-pickup optical system of a digital camera operates as an AF sensor. The image-pickup optical system (auto-exposure control circuit 112) provides exposure controls by using the diaphragm 102 shifting in association with the focal lens 101 so that light quantity of the object incoming from the outside into the color image sensor 103 is optimal at any time.

At first, in first image-pickup for AF, a light flux 1 (Refer to FIG. 4A) having passed through the aperture section 102a with the diaphragm 102 not shifted is formed on the color image sensor 103, and the object image of the light flux 1 is fetched by the color image sensor 103. The color image sensor 103 transmits image data for an AF area (Refer to FIG. 5) within an image frame of the fetched light flux 1 to the brightness conversion computing section 111 as first image data. The first image data is converted to a brightness signal (Y) by the brightness conversion computing section 111 according to the equation described below. The converted brightness signal (Y) is stored in the image memory (for the AF area of the light flux 1) 104.

$$Y = 0.299 \times R + 0.587 \times G + 0.114 \times B \tag{1}$$

Then, in second image-pickup for AF, a light flux 2 (Refer to FIG. 4B) having passed through the aperture section 102a with the diaphragm 102 shifted is formed on the color image sensor 103, and the object image of the light flux 2 is fetched by the color image sensor 103. The color image sensor 103 transmits image data for an AF area (Refer to FIG. 5) within an image frame of the fetched light flux 2 to the brightness conversion computing section 111 as second image data. The second image data is converted to a brightness signal (Y) by the brightness conversion computing section 111 according to the equation (1) described above, and the signal is stored in the image memory (for the AF area of the light flux 2) 105. Namely, a different light flux is fetched based on the time-division switching.

Subsequently, the cross-correlation computing section 106 computes a cross-correlation coefficient between the two image data (first image data (first brightness signal) and second image data (second brightness signal)) stored in the image memories 104 and 105. When the two image data are directly computed in a spatial area, enormous amount of computations on sum of products is required as the AF area becomes larger, so that it takes longer time. Assuming that the first and second image data for the AF area are f (u, v) and g (u, v) respectively and a cross-correlation coefficient is h (u, v), the cross-correlation coefficient h (u, v) is represented as shown in the following equation (2).

$$h(u, v) = f(u, v) * g(u, v) \tag{2}$$

Where * represents a symbol of correlation computation.

In the embodiment, a number of computations is largely reduced by replacing computation in a spatial area with multiplication in a frequency area.

More specifically, the two-dimensional FFT sections 200, 201 execute two-dimensional Fourier transform to the first and second image data f (u, v), g (u, v) in the AF area stored in the image memories 104, 105 respectively to be converted to data F (U, V), G (U, V) in the frequency area.

Subsequently, the complex multiplication section 202 executes complex multiplication as shown in the following equation (3) to the data F (U, V), G (U, V) in the frequency area, and computes a cross-correlation coefficient H (U, V) in the frequency area.

$$H(U, V) = F(U, V) \times G(U, V)^* \quad (3)$$

Where G (U, V)* is complex conjugate of G (U, V).

Then, the two-dimensional IFFT section 203 executes two-dimensional inverse Fourier transformation to the cross-correlation coefficient H (U, V) in the above mentioned frequency area to compute a cross-correlation coefficient h (u, v) in the spatial area. Thus, it is possible to compute a cross-correlation coefficient h (u, v) with the help of a small amount of computations. The cross-correlation coefficient h (u, v) is stored in the memory 107 for cross-correlation coefficients.

The distance/direction computing section 108 computes the present position of the focal lens 101 and a distance as well as a direction up to the focus position from a distance between a peak point of the cross-correlation coefficient h (u, v) stored in the memory 107 for cross-correlation coefficients and the original point (focal point) as well as from a direction thereof (Refer to FIG. 6). The AF optical system drive circuit 109 shifts the focal lens 101 to the focus position according to the distance up to the focus position of the focal lens 101 as well as to the direction thereof computed in the distance/direction computing section 108.

Furthermore, the focal lens 101 is shifted once to the focus position to enhance precision of focusing, and then, in order to determine whether the lens has reached the focus position or not, a frame (light flux 1) obtained by picking up the portion of the AF area without shifting of the aperture section 102a and a frame (light flux 2) obtained by picking up the portion thereof with the aperture section 102a shifted are prepared once more in the same manner as described above to compute a cross-correlation coefficient between the two image data. When it is determined that the lens has reached the focus position, a standby state for photographing is effected, on the other hand, when it is determined that the lens has not reached the focus position, the AF operation is repeated again. The AF operation is finished with the operations described above.

As for the number of AF operations, when a shift-starting position of the focal lens 101 is adjacent to the focus position, focus information is acquired from an image in substantially proper focus, therefore a correlation coefficient shows a sharp peak and the lens reaches within an allowable range of the focus position with one AF operation. When the shift-starting position of the focal lens 101 is far from the focus position, focus information is acquired from an image that is out of focus, therefore a correlation coefficient shows a mild peak and the lens reaches within an allowable range of the focus position with a plurality times of AF operation.

When the lens has reached any position adjacent to the focus position, it may be determined that the point where the high-frequency component reaches its peak is a focus position by concurrently using any unit of detecting a high-frequency component of the image of the AF area as used in the exploratory method. In this case, frequency component data for Fourier transform at the time of computing a cross correlation can be used in place of preparing a filter circuit for detection of a high-frequency component, which eliminates the need for the filter circuit.

When the AF operation is finished, preparation for actual photography of the object is performed. Then, a standby state for full-pressing of the shutter button is effected.

When the shutter button is fully pressed, the shutter is opened for a prespecified period of time in association with the pressing, and the light from the object is received by the color image sensor 103. Then, the image of the object is photoelectrically converted by the color image sensor 103, the converted image data is transmitted to the frame-image memory 113 for each color (R, G, B) to be stored therein once. The image data stored in the frame-image memory 113 is transmitted to an image processing system in the rear stage not shown therein to be subjected to image processing such as white balance, and the processed image data is stored or displayed on a monitor.

Although the description in the section above has been made for the diaphragm shift mechanism for shifting the diaphragm 102 in one vertical direction with respect to the optical axis, the present invention is not limited to the mechanism, and may be configured so that the diaphragm 102 is shifted in two vertical directions (left vertical direction and right vertical direction) symmetric with respect to the optical axis. FIGS. 7A to 7F explain a case where the aperture section 102a of the diaphragm 102 is shifted in two vertical directions (left vertical direction and right vertical direction) symmetric with respect to the optical axis.

FIG. 7A shows a case where the diaphragm 102 is shifted to the left with respect to the optical axis (left vertical direction) as well as a case where the object is bright, FIG. 7B shows a case where the diaphragm 102 is not shifted and the object is bright, and FIG. 7C shows a case where the diaphragm 102 is shifted to the right with respect to the optical axis (right vertical direction) and the object is bright. Further, FIG. 7D shows a case where the diaphragm 102 is shifted to the left with respect to the optical axis (left vertical direction) and the object is dark, FIG. 7E shows a case where the diaphragm 102 is not shifted and the object is dark, and FIG. 7F shows a case where the diaphragm 102 is shifted to the right with respect to the optical axis (right vertical direction) and the object is dark. A numerical aperture of the diaphragm 102 is determined by the auto-exposure control section 112 as described above. In addition, ordinary photographing is carried out under the situation that the diaphragm 102 is not shifted (Refer to FIGS. 7B and 7E).

When photographing for AF, in first image-pickup, a light flux 1 is passed through the aperture section 102a located at the position shown in FIG. 7A or FIG. 7D, while in second image-pickup, a light flux 2 is passed through the aperture section 102a located at the position shown in FIG. 7C or FIG. 7E.

As described above, in Embodiment 1, there is provided a diaphragm shift mechanism 110 for previously providing an area (AF area) where the photographer wants to obtain proper focus within an image-pickup area of the color image sensor 103 and shifting the diaphragm 102 in one vertical direction with respect to the optical axis, a frame obtained by picking up an image with the light flux 1 passing through the aperture section 102a of the diaphragm 102 when the diaphragm 102 is not shifted and a frame obtained by picking up an image with the light flux 2 passing through the aperture section 102a of the diaphragm 102 when the diaphragm 102 is shifted are prepared, and a cross-correlation coefficient between the AF areas of the two frames is computed, so that the diaphragm can be used no matter when the focus may be controlled. This allows a distance up to a focus position of a focal lens or of an image sensor as well as a direction thereof to be obtained with optimal incident light quantity due to automatic exposure being kept, and a quick focusing operation to be achieved regardless of whether the object is bright or dark.

Furthermore, in Embodiment 1, there is provided a diaphragm shift mechanism (Refer to FIGS. 7A to 7E) for previously providing an area (AF area) where the photographer wants to obtain proper focus within an image-pickup area of the color image sensor 103 and shifting the diaphragm 102 in two vertical direction symmetric with respect to the optical axis, a frame obtained by picking up an image with the light flux 1 through the diaphragm 102 when the diaphragm 102 is shifted in one of the vertical directions and a frame obtained by picking up an image with the light flux 2 passing through the aperture section 102a of the diaphragm 102 when the diaphragm 102 is shifted in the other one of the vertical directions are prepared, and a cross-correlation coefficient between the AF areas of the two frames is computed, so that the diaphragm can be used no matter when the focus may be controlled. This allows a distance up to a focus position of a focal lens or of an image sensor as well as a direction thereof to be obtained with optimal incident light quantity due to automatic exposure being kept, and a quick focusing operation to be achieved regardless of the brightness of the object. This is especially effective when normal image-pickup is desired at the central position of the focal lens.

Further, in Embodiment 1, during the process of computing a cross-correlation coefficient from AF areas of two frames, brightness data computed based on outputs (primary-color system RGB or complementary-color system YMC) from a color image sensor is used as AF area data, so that an AF operation can be executed with a smaller number of computations as compared to the method of computing a cross-correlation coefficient for each color. In addition, this method can cope with whatever be the hue of the object.

Further, in Embodiment 1, even when photographing for AF, a numerical aperture of the diaphragm 102 is also automatically controlled according to a brightness of the object with the help of the auto-exposure control circuit 112. Therefore, data for a correct-exposure image can be acquired, and it becomes possible to perform high-precision focusing.

Further, in Embodiment 1, a correlation of images is computed by employing two-dimensional Fourier transform as computation of a cross correlation, so that the invention according to Embodiment 1 is suitable for a digital integrated circuit such as a microprocessor and a DSP.

Further, in Embodiment 1, the exploratory method is concurrently used in a place adjacent to a focal point, and a high-frequency component of a picked-up image which will be the evaluated value is computed from outputs obtained by the two-dimensional Fourier transform, so that the need for additionally providing any filter for extraction of a high-frequency component like in the conventional technology is eliminated.

FIG. 8 is a block diagram of an AF processing system in a digital camera according to Embodiment 2. Although the digital camera according to Embodiment 1 computes a correlation coefficient from a brightness signal, the digital camera according to Embodiment 2 computes a correlation coefficient from color components in which contrast of image data is the highest in place of the brightness signal.

The AF processing system in the digital camera according to Embodiment 2 (FIG. 8) is different from that of Embodiment 1 (FIG. 1) in points that the AF processing system in FIG. 8 has no brightness conversion computing section 111 but has selectors 115 and 116 instead and that image memories 104 and 105 store therein image data for each color (RGB) in place of a brightness signal. The other sections of the configuration are the same as those in FIG. 1, so that the same reference numerals are assigned to the sections corresponding to those in FIG. 1 and description thereof is omitted herein.

In Embodiment 2, in first image-pickup for AF, a light flux 1 (Refer to FIG. 4A) having passed through the aperture section 102a is formed on the color image sensor 103 in a state where the diaphragm 102 is not shifted, and an object image of the light flux 1 is fetched by the color image sensor 103. The color image sensor 103 stores image data of an AF area (Refer to FIG. 5) within an image frame of the fetched light flux 1 in the image memory 104 for each color (RGB) as first image data. Then, in second image-pickup for AF, a light flux 2 (Refer to FIG. 4B) having passed through the aperture section 102a is formed on the color image sensor 103 in a state where the diaphragm 102 is shifted, and an object image of the light flux 2 is fetched by the color image sensor 103. The color image sensor 103 stores image data of an AF area (Refer to FIG. 5) within an image frame of the fetched light flux 2 in the image memory 105 for each color (RGB) as second image data.

The selectors 115, 116 output image data for color components whose contrast is the highest of the image data stored in the image memories 104, 105 to correlation coefficient computing sections (two-dimensional FFT sections) respectively. Then, correlation coefficients are computed in the correlation coefficient computing sections in the same method as that in Embodiment 1. The other parts of the AF operation are the same as those in Embodiment 1 and description there of is omitted herein.

In Embodiment 2, when image data is an RGB system, the capacity required for the image memory is three times as much as compared to the case of the image memory in Embodiment 1, but data is retained discretely for each of RGB as compared to the case where a cross-correlation coefficient is computed from brightness signals, so that it is possible to control a focal point without giving any influence to any hue received from an object.

As described above, in Embodiment 2, during the process of computing a cross-correlation coefficient from AF areas of two frames, data for colors with which contrast of AF areas is the highest of outputs (primary-color system RGB or complementary-color system YMC) from a color image sensor is used as AF area data, so that AF operation can be executed with a smaller number of computations as compared to the case of computing a cross-correlation coefficient for each color. In addition, this case can be utilized what ever be the hue of the object, and especially when the object is bluish dark, it is more effective as compared to the case where a cross-correlation coefficient is computed by using brightness signals.

Although the autofocus apparatus according to the present invention is applied in a digital still camera in the Embodiment 1 and Embodiment 2, the present invention is not limited to these embodiments. The present invention can acquire a distance up to a focus position as well as a direction thereof at an arbitrary position of a focal lens and can use the system as a tracing servo-system on the principle thereof, so that the present invention is also applicable in a digital video camera.

Furthermore, in the above mentioned Embodiment 1 and Embodiment 2, by applying digital signal processing based on two-dimensional discrete Fourier transform for computation of a cross correlation for controlling a focal point, surplus capacity of a microprocessor for a camera controller may be used, or a computing circuit may be provided in an integrated circuit such as an IPP (Image Pre-Processor).

As described above, according to the present invention, there are provided a diaphragm for restricting a light flux from an object as a target for focusing and a diaphragm shift mechanism for shifting the diaphragm in one vertical direction with respect to an optical axis of a focal lens. A portion of an image frame is set as an AF area. In first image-pickup, first image data is acquired for the AF area within the image frame according to a first light flux from the object as a target for focusing passing through an aperture section of the diaphragm when the diaphragm is not shifted by the diaphragm shift mechanism. In second image-pickup, second image data is acquired for the AF area within an image frame according to a second light flux from the object as a target for focusing passing through the aperture section of the AF when the diaphragm is shifted in one vertical direction with respect to the optical axis by the diaphragm shift mechanism. A cross correlation between the first image data and the second image data is calculated. Then, a distance up to a focus position of the focal lens as well as a direction thereof is computed according to the cross correlation to drive the focal lens to the focus position. Thus, with the present invention it is possible to provide an autofocus apparatus enabling a high-speed focusing operation with low-cost configuration.

According to the present invention, there are provided a diaphragm for restricting a light flux from an object as a target for focusing and a diaphragm shift mechanism for shifting the diaphragm in two vertical directions with respect to an optical axis of a focal lens. A portion of an image frame is set as an AF area. In first image-pickup, first image data is acquired for the AF area within the image frame according to a first light flux from the object as a target for focusing passing through an aperture section of the diaphragm when the diaphragm is shifted in one of the vertical directions by the diaphragm shift mechanisms. In second image-pickup, second image data is acquired for the AF area within the image frame according to a second light flux from the object as a target for focusing passing through the aperture section of the diaphragm when the diaphragm is shifted in the other one of the vertical directions by the diaphragm shift mechanism. A cross correlation between the first image data and the second image data is computed. Then, a distance up to a focus position of the focal lens as well as a direction thereof is computed according to the cross correlation to drive the focal lens to the focus position. Thus, with the present invention it is possible to provide an autofocus apparatus enabling a high-speed focusing operation with low-cost configuration.

With the present invention, in either one of the inventions described above, the cross correlation is computed according to brightness signals of the first image data as well as of the second image data. Therefore, it is possible to execute an AF operation with a smaller number of computations as compared to the method of computing a cross-correlation coefficient for each color.

With the present invention, in either one of the inventions described above, the cross correlation is computed according to image data for colors, of the first image data and the second image data, of which contrast is the highest. Therefore, it is possible to execute an AF operation with a smaller number of computations as compared to the case of computing a correlation coefficient for each color.

With the present invention, there is further provided an exposure control unit for automatically adjusting the numerical aperture of the diaphragm according to the brightness of the object. Therefore, it is possible to acquire data for a correct-exposure image, thus high-precision focusing being possible.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An autofocus apparatus, comprising:
   a focal lens for focusing on an object as a target for focusing;
   an image pickup means for converting the image of the object to electrical signals and outputting the electrical signals as image data;
   a diaphragm means for restricting a light flux from the object; and
   a diaphragm shift mechanism for shifting said diaphragm means in one vertical direction with respect to an optical axis, wherein:
   a portion of a frame of an image picked up by said image pickup means is set as an AF area;
   in a first image-pickup, first image data is acquired for the AF area within the image frame according to a first light flux from the object passing through an aperture section of said diaphragm means when said diaphragm means is not shifted by said diaphragm shift mechanism; and
   in a second image-pickup, second image data is acquired for the AF area within the image frame according to a second light flux from the object passing through the aperture section of said diaphragm means when said diaphragm means is shifted in one vertical direction with respect to the optical axis by said diaphragm shift mechanism; the autofocus apparatus further comprising:
   a cross-correlation computing section configured to compute a two-dimensional cross correlation between the first image data and the second image data; and
   a distance/direction computing section configured to compute a distance up to a focus position of said focal lens as well as a direction thereof according to the cross correlation, to drive said focal lens to the focus position.

2. The autofocus apparatus according to claim 1, wherein the cross correlation is computed according to brightness signals of the first image data as well as of the second image data.

3. The autofocus apparatus according to claim 1, wherein the cross correlation is computed according to color image data of the first image data and the second image data, for a corresponding color for which contrast is the highest.

4. The autofocus apparatus according to claim 1, further comprising:
   an exposure control means for automatically adjusting the numerical aperture of said diaphragm according to the brightness of the object.

5. An autofocus apparatus, comprising:
   a focal lens for focusing on an object as a target for focusing;
   an image pickup means for converting the image of the object to electrical signals and outputting the electrical signals as image data;

a diaphragm means for restricting a light flux from the object; and a diaphragm shift mechanism for shifting said diaphragm means in two vertical directions with respect to the optical axis, wherein:

a portion of a frame of an image picked up by said image pickup means is set as an AF area;

in a first image-pickup, first image data is acquired for the AF area within the image frame according to a first light flux from the object passing through an aperture section of said diaphragm means when said diaphragm is shifted in one of the vertical directions by said diaphragm shift mechanism; and in a second image-pickup, second image data is acquired for the AF area within the image frame according to a second light flux from the object passing through the aperture section of said diaphragm means when said diaphragm means is shifted in another one of the vertical directions by said diaphragm shift mechanism; the autofocus apparatus further comprising:

a cross-correlation computing section configured to compute a two-dimensional cross correlation between the first image data and the second image data; and a distance/direction computing section configured to compute a distance up to a focus position of said focal lens as well as a direction thereof according to the cross correlation, to drive said focal lens to the focus position.

6. The autofocus apparatus according to claim 5, wherein the cross correlation is computed according to brightness signals of the first image data as well as of the second image data.

7. The autofocus apparatus according to claim 5, wherein the cross correlation is computed according to color image data of the first image data and the second image data, for a corresponding color for which contrast is the highest.

8. The autofocus apparatus according to claim 5, further comprising:

an exposure control means for automatically adjusting the numerical aperture of said diaphragm according to the brightness of the object.

9. An autofocus apparatus, comprising:

a focal lens that focuses on an object as a target for focusing;

a color image sensor that converts the image of the object to electrical signals and outputs the electrical signals as image data;

a diaphragm that restricts a light flux from the object; and a diaphragm shift mechanism that shifts said diaphragm in one vertical direction with respect to an optical axis, wherein:

a portion of a frame of an image picked up by said color image sensor is set as an AF area;

in a first image-pickup, first image data is acquired for the AF area within the image frame according to a first light flux from the object passing through an aperture section of said diaphragm when said diaphragm is not shifted by said diaphragm shift mechanism; and in a second image-pickup, second image data is acquired for the AF area within the image frame according to a second light flux from the object passing through the aperture section of said diaphragm when said diaphragm is shifted in one vertical direction with respect to the optical axis by said diaphragm shift mechanism; the autofocus apparatus further comprising:

a cross-correlation computing section configured to compute a two-dimensional cross correlation between the first image data and the second image data; and a distance/direction computing section configured to compute a distance up to a focus position of said focal lens as well as a direction thereof is computed according to the cross correlation, to drive said focal lens to the focus position.

10. The autofocus apparatus according to claim 9, wherein the cross correlation is computed according to brightness signals of the first image data as well as of the second image data.

11. The autofocus apparatus according to claim, wherein the cross correlation is computed according to image data of the first image data and the second image data, for a corresponding color for which contrast is the highest.

12. The autofocus apparatus according to claim 9, further comprising:

an exposure control unit for automatically adjusting the numerical aperture of said diaphragm according to the brightness of the object.

13. An autofocus apparatus, comprising:

a focal lens that focuses on an object as a target for focusing;

a color image sensor that converts the image of the object to electrical signals and outputs the electrical signals as image data;

a diaphragm that restricts a light flux from the object; and a diaphragm shift mechanism that shifts said diaphragm in two vertical directions with respect to the optical axis, wherein:

a portion of a frame of an image picked up by said color image sensor is set as an AF area;

in a first image-pickup, first image data is acquired for the AF area within the image frame according to a first light flux from the object passing through an aperture section of said diaphragm when said diaphragm is shifted in one of the vertical directions by said diaphragm shift mechanism; and in a second image-pickup, second image data is acquired for the AF area within the image frame according to a second light flux from the object passing through the aperture section of said diaphragm when said diaphragm is shifted in another one of the vertical directions by said diaphragm shift mechanism; the autofocus apparatus further comprising:

a cross-correlation computing section configured to compute a two-dimensional cross correlation between the first image data and the second image data; and a distance/direction computing section configured to compute a distance up to a focus position of said focal lens as well as a direction thereof according to the cross correlations to drive said focal lens to the focus position.

14. The autofocus apparatus according to claim 13, wherein the cross correlation is computed according to brightness signals of the first image data as well as of the second image data.

15. The autofocus apparatus according to claim 13, wherein the cross correlation is computed according to image data of the first image data and the second image data, for a corresponding color for which contrast is the highest.

16. The autofocus apparatus according to claim 13, further comprising:

an exposure control unit for automatically adjusting the numerical aperture of said diaphragm according to the brightness of the object.

* * * * *